US006792968B1

(12) United States Patent
Breeden

(10) Patent No.: US 6,792,968 B1
(45) Date of Patent: Sep. 21, 2004

(54) PUMP ASSEMBLY AND METHOD

(76) Inventor: Robert H. Breeden, 732 Beechwood Dr., Wooster, OH (US) 44691-2747

( * ) Notice: Subject to any disclaimer, the term of this patent is extended or adjusted under 35 U.S.C. 154(b) by 0 days.

(21) Appl. No.: 10/648,906

(22) Filed: Aug. 27, 2003

Related U.S. Application Data

(62) Division of application No. 10/243,373, filed on Sep. 13, 2002, now Pat. No. 6,662,784, which is a continuation of application No. 09/580,877, filed on May 30, 2000, now Pat. No. 6,460,510.

(51) Int. Cl.[7] .......................... F16K 23/00; F02M 37/04

(52) U.S. Cl. ............................ 137/315.01; 137/315.33; 251/359; 123/506; 417/549; 417/273

(58) Field of Search ................................ 123/495, 506; 137/315.11, 315.01, 315.33; 251/359, 362; 417/549, 554, 567, 545, 559, 273, 454, 571, 494, 296; 92/171.1

(56) References Cited

U.S. PATENT DOCUMENTS

| | | | | | |
|---|---|---|---|---|---|
| 2,732,805 | A | | 1/1956 | Lucien | 103/42 |
| 3,068,893 | A | | 12/1962 | Nicolaus | 137/510 |
| 3,092,083 | A | | 6/1963 | Sheppard | 121/41 |
| 3,430,647 | A | | 3/1969 | Suchowolec | 137/377 |
| 3,482,768 | A | | 12/1969 | Cirrincione et al. | 230/205 |
| 3,519,370 | A | | 7/1970 | Bleuel | 103/5 |
| 3,548,870 | A | | 12/1970 | Morton et al. | 137/540 |
| 3,682,572 | A | * | 8/1972 | Yarger | 417/273 |
| 3,878,861 | A | | 4/1975 | Pareja | 137/543.17 |
| 3,911,950 | A | | 10/1975 | Lowe et al. | 137/543.17 |
| 3,912,421 | A | * | 10/1975 | Gelin | 417/273 |
| 3,995,973 | A | | 12/1976 | Ring et al. | 417/214 |
| 4,273,516 | A | | 6/1981 | Farr | 417/214 |
| 4,366,747 | A | | 1/1983 | Falendysz et al. | 92/72 |
| 4,667,697 | A | * | 5/1987 | Crawford | 137/543.17 |
| 4,692,102 | A | * | 9/1987 | Hafele et al. | 417/296 |
| 4,889,151 | A | | 12/1989 | Oten | 137/71 |
| 4,911,615 | A | | 3/1990 | McCullagh | 417/295 |
| 5,035,221 | A | * | 7/1991 | Martin | 123/451 |
| 5,193,579 | A | | 3/1993 | Bauer et al. | 137/540 |
| 5,469,828 | A | * | 11/1995 | Heimberg et al. | 123/497 |
| 5,993,179 | A | * | 11/1999 | Baur et al. | 417/554 |
| 6,019,124 | A | * | 2/2000 | Sebion et al. | 137/454.4 |
| 6,170,508 | B1 | | 1/2001 | Faust et al. | 137/12 |
| 6,186,747 | B1 | * | 2/2001 | Zhou et al. | 417/269 |
| 6,193,481 | B1 | * | 2/2001 | Alaze et al. | 417/549 |
| 6,361,295 | B2 | * | 3/2002 | Schuller et al. | 417/549 |
| 6,544,007 | B2 | * | 4/2003 | Gethofer et al. | 417/273 |
| 6,679,684 | B2 | * | 1/2004 | Kominami | 417/214 |

* cited by examiner

*Primary Examiner*—Carl S. Miller
(74) *Attorney, Agent, or Firm*—Hooker & Habib, P.C.

(57) ABSTRACT

A pump assembly flows pressurized engine oil to hydraulic injectors in a diesel engine. The assembly includes a high-pressure pump with a bored piston passage. The outer end of the piston bore is closed by a plug assembly pressed in the bore.

8 Claims, 3 Drawing Sheets

90
96
100
98
99
92
102
101
38
94
24
104
26

92
91

240
76
242

250
248
254
252
246
110
76
242
244
28

PUMP ASSEMBLY AND METHOD

This application is a division of application Ser. No. 10/243,373 for "Pump Assembly, Valve and Method" filed Sep. 13, 2002, now U.S. Pat. No. 6,662,784, which is a continuation of application Ser. No. 09/580,877 for "Pump Assembly and Method" filed May 30, 2000, now U.S. Pat. No. 6,460,510.

FIELD OF THE INVENTION

The invention relates to pump assemblies using plug assemblies to close the ends of piston bores and to methods for mounting plug assemblies in the bores. The pump assemblies are typically used in internal combustion engines to pressurize liquid used to actuate engine components including fuel injectors and intake and exhaust valves.

DESCRIPTION OF THE PRIOR ART

Fuel injection systems using high-pressure pumps for flowing actuating liquids are well known. The injectors include electronically controlled actuation solenoids that open a valve for an interval to permit liquid pressurized by a pump to extend a fuel plunger and inject fuel into a combustion chamber. Pumped high-pressure liquid may also actuate intake and exhaust valves and other engine components.

The pressure of the liquid is maintained by a high-pressure pump assembly, typically having a number of piston pumps with pistons reciprocated in piston bores to increase the pressure of the liquid.

The piston bores are typically drilled into the body of the pump assembly and closed at outer ends by plugs. The plugs are subject to the high outlet pressure of the pumped liquid and must engage the walls of the bores tightly to prevent leaks or pressure dislodgment. Cutting threads into the end of the bores to receive threaded plugs is undesirable as this can leave metal shavings that are difficult to remove. Metal shavings entrained in the pumped liquid can injure the pump and components actuated by the high-pressure liquid.

Therefore, there is a need for an improved bore plug assembly for closing the ends of piston bores in high-pressure pumps and for an improved method of installing plug assemblies in piston bores. The plug assembly should be easily and reliably installed without using threads or introducing shavings into the pump assembly.

SUMMARY OF THE INVENTION

The invention is a pump assembly with improved plug assemblies closing the ends of piston bores and a method of installing a plug assembly in the end of a piston bore in a high-pressure pump, such as a high-pressure pump used in modern internal combustion engines. The plug assemblies engage the bores tightly to prevent leaks and pressure dislodgment. The plug assemblies are fitted in drilled piston bores without the need to cut threads in the bores and clean shavings from the bores.

Other objects and features of the invention will become apparent as the description proceeds, especially when taken in conjunction with the accompanying drawings illustrating the invention.

DESCRIPTION OF THE PREFERRED EMBODIMENT

Figure 1:
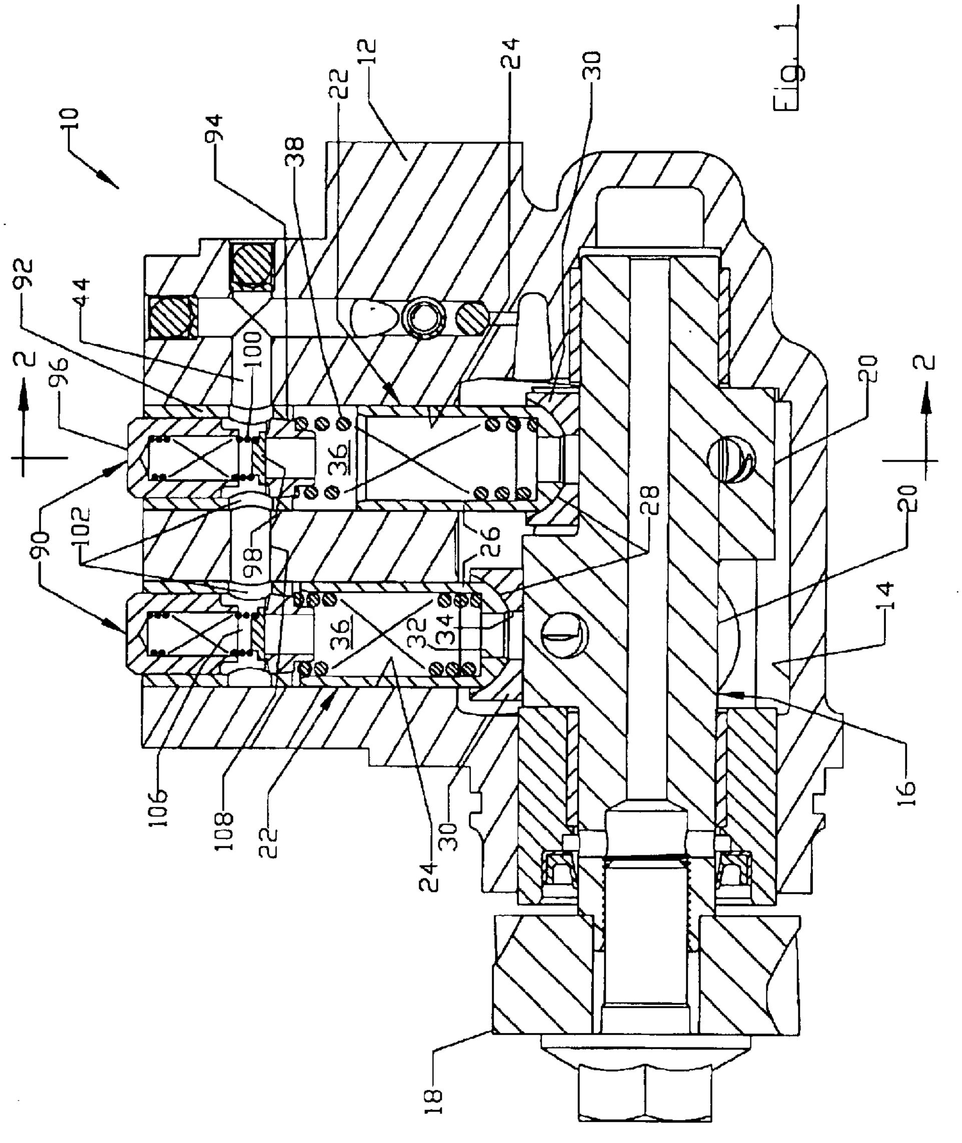
FIG. 1 is a sectional view illustrating the pump assembly.

Pump assembly 10 is a component of an internal combustion engine and includes a body 12 having an interior crank chamber 14. Crankshaft 16 is mounted in the crank chamber and includes an end extending outwardly of the chamber. Drive gear 18 is mounted on the end of the crankshaft outwardly of body 12. The crankshaft includes two cylindrical eccentrics 20 located in chamber 14.

Figure 2:
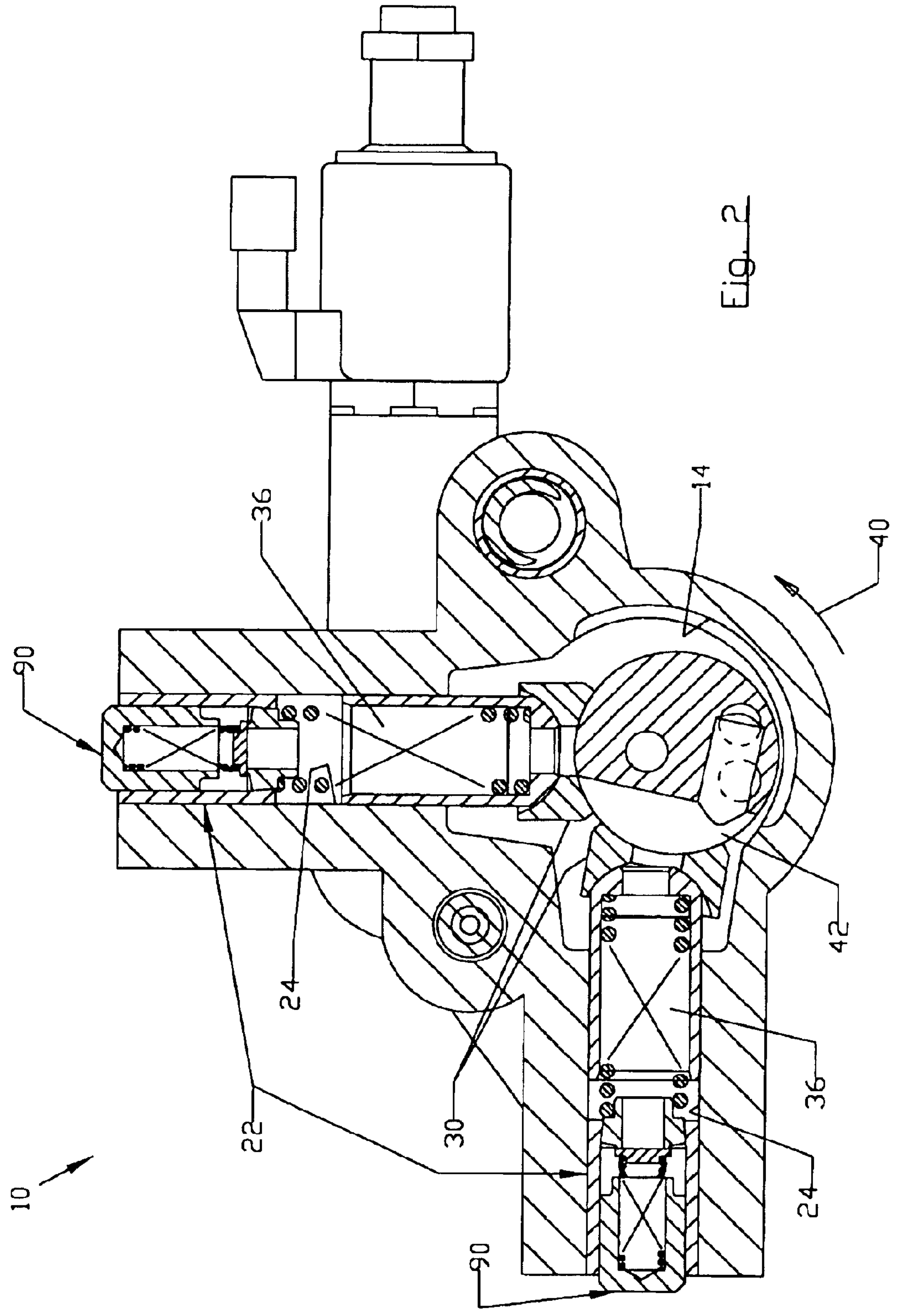
FIG. 2 is a sectional view taken along line 2—2 of FIG. 1.

In assembly 10, each eccentric 20 drives a pair of like, 90 degree-spaced check valve piston pumps 22. The pumps driven by each eccentric are spaced 90 degrees apart around the axis of the crankshaft as shown in FIG. 2.

Each check valve piston pump 22 includes a piston bore 24 formed in body 12 and extending perpendicularly to the axis of the crank shaft. A hollow cylindrical piston 26 has a sliding fit within the inner end of each bore 24. The piston has a spherical inner end 28 adjacent the crankshaft. End 28 is fitted in a spherical recess in a slipper socket 30 located between the piston and the eccentric actuating the pump. The inner concave surface of the slipper socket is cylindrical and conforms to the surface of the adjacent cylindrical eccentric. Central passage 32 in the spherical end of the piston and passage 34 in the slipper communicate the surface of the eccentric with variable volume pumping chamber 36 in piston 26 and bore 24. The variable volume portion of the pumping chamber is located in bore 24.

A check valve or plug assembly 90 closes the outer end of each piston bore 24. Each assembly 90 includes a sleeve 92 tightly fitted in the end of bore 24. A cylindrical seat 94 is fitted in the inner end of the sleeve. Plug 96 is fitted in the sleeve to close the outer end of bore 24. Poppet disc or valve member 98 is normally held against the outer end of seat 94 by poppet spring 100 fitted in plug 96. A central boss 99 projects above valve member 98 and is fitted in spring 100.

A piston spring 38 is fitted in each piston 26 and extends between the spherical inner end of the piston 26 and seat 94. Spring 38 holds the piston against pump slipper 30 and the slipper against an eccentric 20.

Crankshaft 16 is rotated in the direction of arrow 40 shown in FIG. 2. Lubricating oil from the low-pressure oil pump of the engine driving assembly 10 flows into the crank chamber 14 through an inlet passage (not illustrated). During return strokes of pistons low-pressure oil flows from chamber 14 through slot 42 in each eccentric and passages 32 and 34 of each pump to fill the pump chambers. Rotation of crankshaft 16 moves the slots 42 in the surfaces of the eccentrics into and out of engagement with slipper passages 34 to permit unobstructed flow of engine oil from the crank chamber into the pumping chambers 36. Rotation of the crankshaft also moves the pistons 26 up and down in bores 76 to pump oil past the check valves. During rotation of the crankshaft the piston springs 38 hold the pistons against the slippers and the slippers against the eccentrics while the slippers oscillate on the spherical end of the pistons. The eccentric and slipper of each pump form an inlet valve for flowing oil into the pumping chamber during return strokes of the piston. The inlet valve is closed during pumping strokes. Pumped, high-pressure oil flows past the poppet valve 98 into chamber 106 between the valve and the plug 96, through bore or opening 102 in sleeve 92 and into high-pressure outlet passage 44. Passage 44 leads to an outlet port (not illustrated) on the outside of the body and is connected to a pressure line leading to the fuel injectors actuated by the high-pressure oil. The high-pressure oil may actuate other types of components.

High-pressure oil from the pump 22 shown on the left in FIG. 1 flows from chamber 106 for the pump through bore 102, through connecting high-pressure passage 108, a bore 102 for the pump shown on the right, into chamber 106 for the pump shown on the right, out the chamber through another bore 102 for the pump shown on the right and into outlet passage 44.

Figures 3, 4, 5, 6:
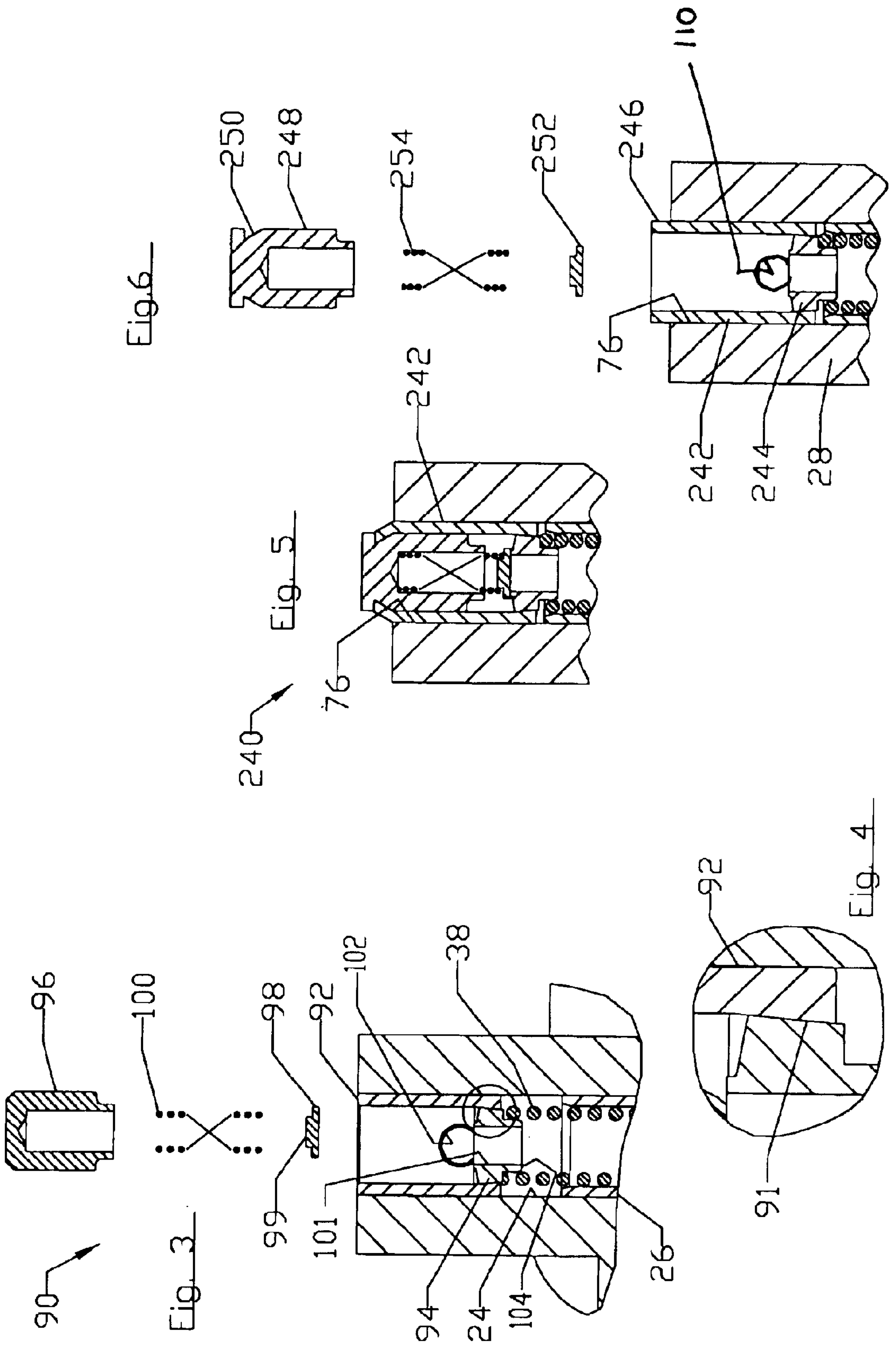
FIGS. 3 and 4 are views illustrating assembly of a first embodiment check plug assembly.
FIGS. 5 and 6 are views illustrating assembly of a second embodiment check plug assembly.

FIGS. 3 and 4 illustrate a method of assembling check valve assembly 90 in the outer end of a piston bore 24 during manufacture of assembly 10. First, piston 26 is extended into open bore 24 and spring 38 is fitted in the piston. The piston engages a slipper 30 on an eccentric 20. Then, sleeve 92, having a tight fit in bore 24, is pressed into the bore.

As illustrated in FIG. 4, the interior surface 91 at the inner wall of sleeve 92 is tapered inwardly and increases the thickness of the sleeve. The outer wall of tubular seat 94 is correspondingly tapered outwardly. The seat 94 is extended into the sleeve so that the tapered surfaces on the end of the sleeve and on the seat engage each other. The seat is then driven to the position shown in FIG. 3 to form a tight-wedged connection with the sleeve. This connection deforms the sleeve against the wall of the bore and strengthens the connection between the sleeve and the bore 24. Reduced diameter collar 104 on the inner end of the seat extends into the center of spring 38 to locate the spring radially within pumping chamber 36.

Next, poppet disc 98 is positioned on spring 100, the spring is fitted in plug 96 and the plug is driven into the open outer end of sleeve 92. Driving of plug 96 into the sleeve forms a strong closed joint between the plug and the sleeve and strengthens the joint between the sleeve and the wall of bore 24. A circular boss 99 on the top of poppet disc 98 extends into the spring 100 so that the spring holds the poppet disc in proper position against seat 94.

FIGS. 5 and 6 illustrate a second embodiment check valve or plug assembly 240 which may be used in check valve pumps 22 in place of assembly 90. Assembly 240 includes a sleeve 242 driven in the outer end of a bore 24 as previously described. Sleeve 242 includes a tapered lower end which receives a seat 244, with a tapered driven connection between the seat and sleeve, as shown in FIG. 4. The outer end 246 of the sleeve extends above the top of body 12 when the sleeve is fully positioned in the bore 24.

Plug 248 of assembly 240 is longer than plug 96 and includes an angled circumferential undercut 250 at the outer end of the plug extending out from body 12. The interior opening of plug 248 has the same depth as the corresponding opening of plug 96.

After sleeve 242 and seat 244 have been driven into the passage, poppet disc 252, like disc 98, is mounted on spring 254, like spring 100, the outer end of the spring is extended into the bore in plug 248 and the plug is driven into the sleeve to the position shown in FIG. 5. Undercut groove 250 is located above the surface of body 12. The upper end of the sleeve is then formed into the undercut groove to make a strong connection closing the outer end of the bore.

Additional features of pump assembly 10 are described in my U.S. Pat. No. 6,460,510, the disclosure of which is incorporated herein in its entirety.

Bores or openings 110, like bores 102, are formed through sleeve 242 to permit flow of high-pressure oil from the pumps to high-pressure outlet passage 44

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A pump assembly including a body; a piston pump in the body; said pump including a piston bore in the body, the bore having an outer end at a side of the body; a piston in the bore; an eccentric; a drive connection between the eccentric and the piston so that rotation of the eccentric moves the piston along pumping and return strokes in the bore, said bore and piston defining a variable volume pumping chamber; a pumping chamber inlet valve; a plug assembly closing the outer end of the piston bore, the plug assembly including a sleeve having an outer end and an inner end, the inner end of the sleeve having a tapered interior wall, the sleeve located in the outer end of the bore so that the sleeve inner end and tapered inner wall are within the piston bore and the sleeve has a tight fit in the piston bore; a tapered surface on the inner wall of the inner end of the sleeve; a valve seat having a tapered outer wall engaging the sleeve tapered surface to form an interference fit between the seat and the sleeve whereby the sleeve is deformed against the wall of the bore; a poppet member engaging a side of the valve seat away from the pumping chamber; a spring biasing the poppet member toward the seat; a plug driven into the sleeve and into the piston bore to form a joint between the plug and sleeve and strengthen the joint between the sleeve and the wall of the piston bore; an opening in the sleeve between the seat and the plug; and a high-pressure outlet passage in the body communicating with the opening in the sleeve.

2. The pump assembly as in claim 1 wherein the sleeve outer end extends outwardly of the body and is deformed into the plug.

3. The pump assembly as in claim 2 wherein the plug includes a circumferential undercut located outwardly of the body and the sleeve outer end is deformed into the circumferential undercut.

4. The pump assembly as in claim 1 wherein the interior wall of the piston bore, the exterior wall of the sleeve, the interior wall of the sleeve above the tapered interior wall and the exterior wall of the plug are cylindrical.

5. The pump assembly as in claim 1 wherein the interior wall of the bore, the exterior wall of the sleeve, the interior wall of the sleeve above the tapered interior wall and the exterior wall of the plug are not threaded.

6. In a high-pressure pump for pressurizing liquid used to actuate components of an internal combustion engine, the method of closing the outer end of a piston bore comprising the steps of:

A) pressing a sleeve into the outer end of the piston bore to locate a tapered surface on the inner wall of the sleeve in the piston bore;

B) positioning a valve seat into the sleeve so that a tapered surface on the seat engages the tapered surface on the sleeve to form a tight-wedged connection between the seat and the sleeve and deform the sleeve against the wall of the piston bore; and C) driving a plug into the outer end of the sleeve to close the outer end of the piston bore, to thereby form a joint between the plug and the sleeve and strengthen the joint between the sleeve and the piston bore.

7. The method of claim 6 including the step of:

D) deforming the outer end of the sleeve into the plug to prevent pressure dislodgement of the plug from the piston bore.

8. The method of claim 6 including the step of:

D) deforming the circumference of the outer end of the sleeve into a circumferential undercut on the plug outwardly of the body.

* * * * *